US007046419B2

(12) United States Patent
Gupta et al.

(10) Patent No.: US 7,046,419 B2

(45) Date of Patent: May 16, 2006

(54) EXTERNAL APERTURING FOR DIGITAL MICROMIRROR DEVICES

(75) Inventors: Anurag Gupta, Corvallis, OR (US); Peter Guy Howard, Junction City, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 57 days.

(21) Appl. No.: 10/917,653

(22) Filed: Aug. 13, 2004

(65) Prior Publication Data

US 2006/0033979 A1 Feb. 16, 2006

(51) Int. Cl.
*G02B 26/00* (2006.01)

(52) U.S. Cl. ...................................... 359/290; 359/298

(58) Field of Classification Search ................ 359/290
See application file for complete search history.

(56) References Cited

U.S. PATENT DOCUMENTS 5,818,095 A * 10/1998 Sampsell .................... 257/435
6,489,984 B1 12/2002 Johnson
6,667,837 B1 12/2003 Shockey
6,954,245 B1 * 10/2005 Mi et al. .................... 349/119
2002/0056900 A1 5/2002 Liu
2004/0150058 A1 8/2004 Liu

* cited by examiner

*Primary Examiner*—Scott J. Sugarman
*Assistant Examiner*—Richard Hanig

(57) ABSTRACT

A digital micromirror device arrangement and devices using the arrangement are disclosed. The arrangement includes a digital micromirror device (DMD) having an active area, a cover plate disposed substantially adjacent to the DMD and having a thickness and a light blocking area having an aperture formed therein. The active area is adapted to receive incoming light and to reflect the incoming light as outgoing light. The light-blocking layer is offset from a plane of the active area by at least the thickness of the cover plate and is adapted to block light from passing therethrough. The aperture is dimensioned to produce a beam of outgoing light having desired dimensions.

42 Claims, 5 Drawing Sheets

200
250
270
240
220
212
252
210
230
260
242

EXTERNAL APERTURING FOR DIGITAL MICROMIRROR DEVICES

BACKGROUND OF THE INVENTION

The present invention relates generally to the field of digital image devices. In particular, the invention relates to external aperturing of digital micromirror devices that may be implemented in, for example, digital projectors.

A typical architecture for a digital projector having a digital micromirror device (DMD) is illustrated in FIG. 1. A typical projector arrangement 100 includes a light source portion 110, a projection portion 120 and an image processing portion 130. The light source portion 110 includes a light source and one or more lenses directing the light to the image processing portion 130. The processed image is then directed from the image processing portion 130 through the projection portion 120 to, for example, a screen. The projection portion also includes one or more lenses to direct and/or focus the image onto the screen.

FIG. 2 illustrates the image processing portion 130 in greater detail. The key component of the image processing portion 130 is a DMD 140 which processes the light into pixels of the image. DMD's are well known to those skilled in the art and do not require further discussion for purposes of this application. A DMD cover plate 150 is provided on the reflective surface of the DMD 140. In a telecentric architecture, a total internal reflection (TIR) prism arrangement 160 is provided in close proximity to the DMD 140. The light from the light source portion 110 is reflected from an internal surface of the TIR prism arrangement 160 to an active region 142 of the DMD 140, which directs the processed image through the TIR prism arrangement 160.

FIG. 3 is a front view of the DMD 140. The active area 142 of the DMD 140 is positioned in a central region. The active area 142 includes reflective surfaces to reflect incoming light to form an image. In order to more precisely define the image, a non-reflective perimeter 144 is formed around the active region to absorb any overfill of incoming light outside the active area. In many instances, the width of the non-reflective perimeter is limited by the manufacturer, in part, due to cost considerations. As a result, the on-screen extinction ratio, or contrast, may be adversely affected. Further, certain optical artifacts reflected by portions of the DMD outside the non-reflective perimeter, such as reflected light from bond leads 146, may be relayed to the screen.

Configuring the non-reflective region at the plane of the active area 140 can be costly. It is desirable to achieve simple and economical systems and methods for enhancing the contrast of the image in such digital projectors.

SUMMARY OF THE INVENTION

One embodiment of the invention relates to a digital micromirror device arrangement. The arrangement includes a digital micromirror device (DMD) having an active area, a DMD cover plate disposed substantially adjacent to the DMD and having a thickness, and a light blocking area having an aperture formed therein. The active area is adapted to receive incoming light and to reflect the incoming light as outgoing light. The light-blocking layer is offset from a plane of the active area by at least the thickness of the DMD cover plate and is adapted to block light from passing therethrough. The aperture is dimensioned to produce a beam of outgoing light having desired dimensions.

It is to be understood that both the foregoing general description and the following detailed description are exemplary and exemplary only, and are not restrictive of the invention as claimed.

DETAILED DESCRIPTION OF THE PREFERRED EMBODIMENTS

Figure 1:
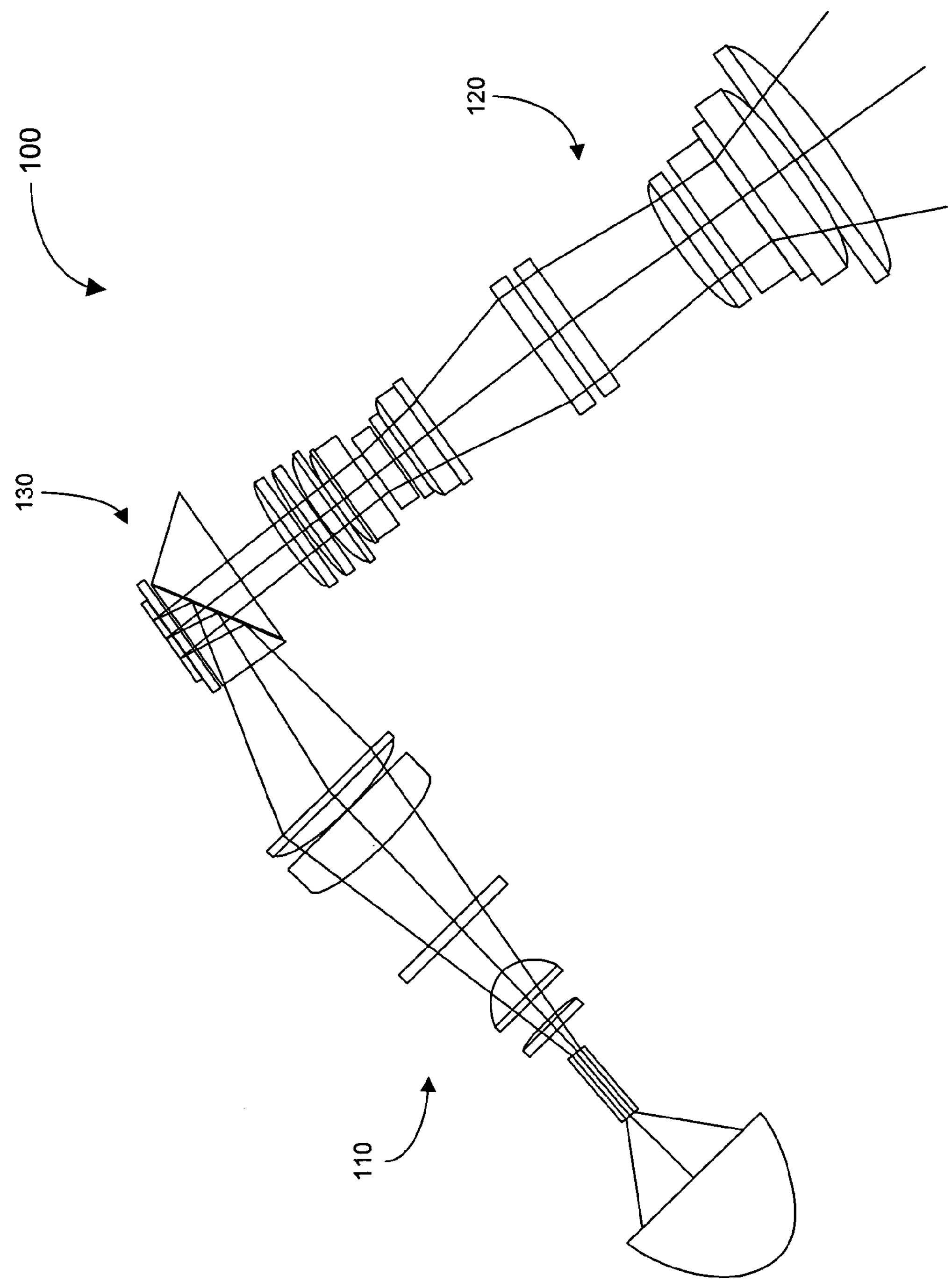
FIG. 1 illustrates a typical digital projector having a digital micromirror device (DMD)
Figure 2:
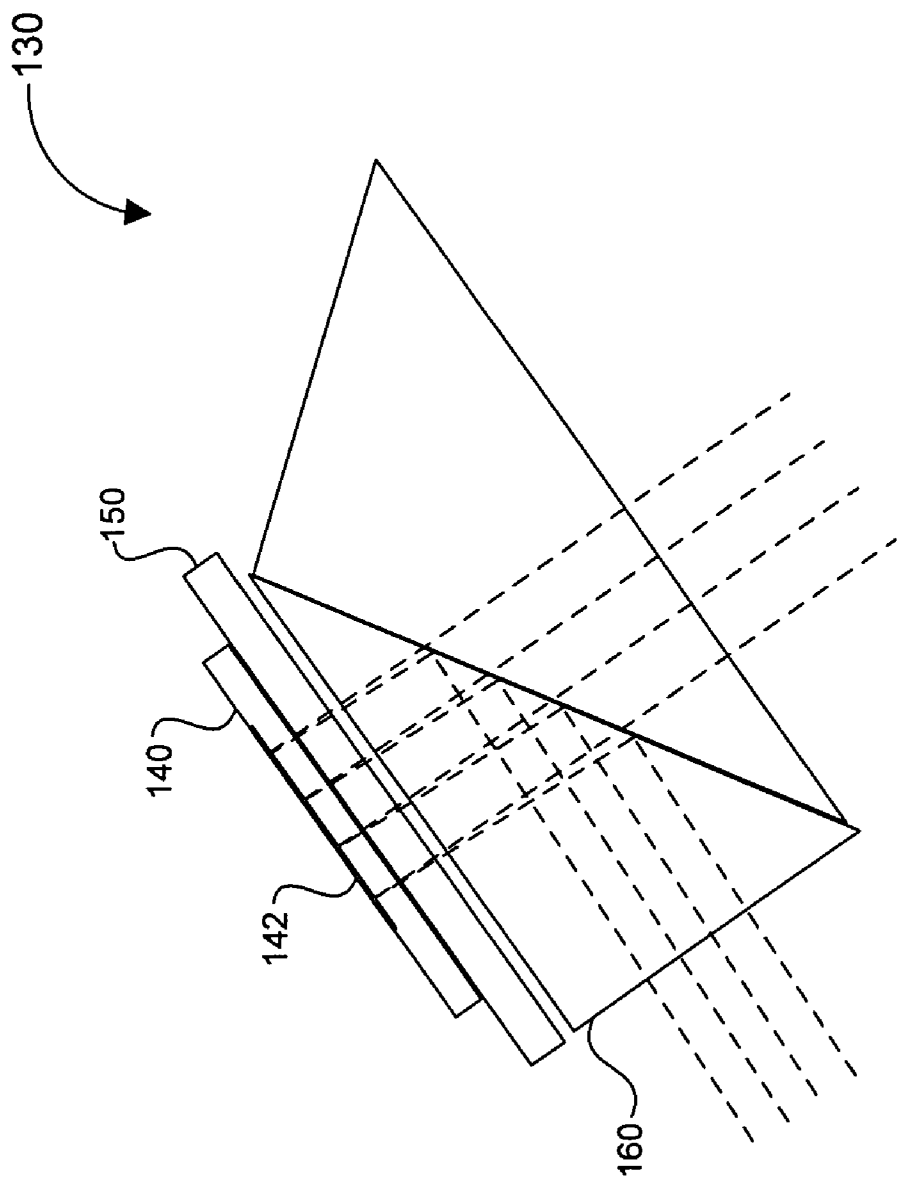
FIG. 2 illustrates the image processing portion of the digital projector of FIG. 1 in greater detail.
Figure 3:
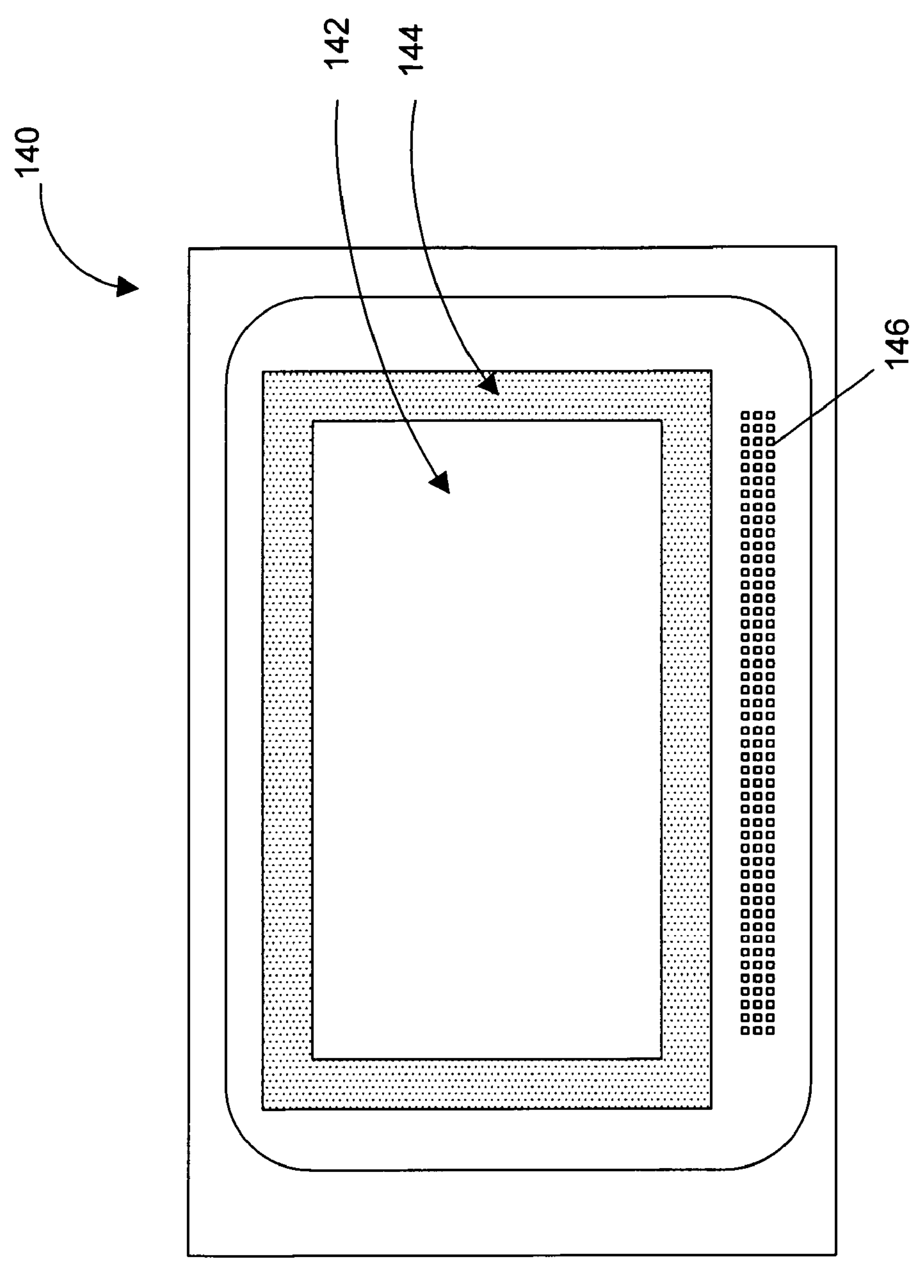
FIG. 3 is a front view of the DMD in FIGS. 1 and 2.
Figure 4:
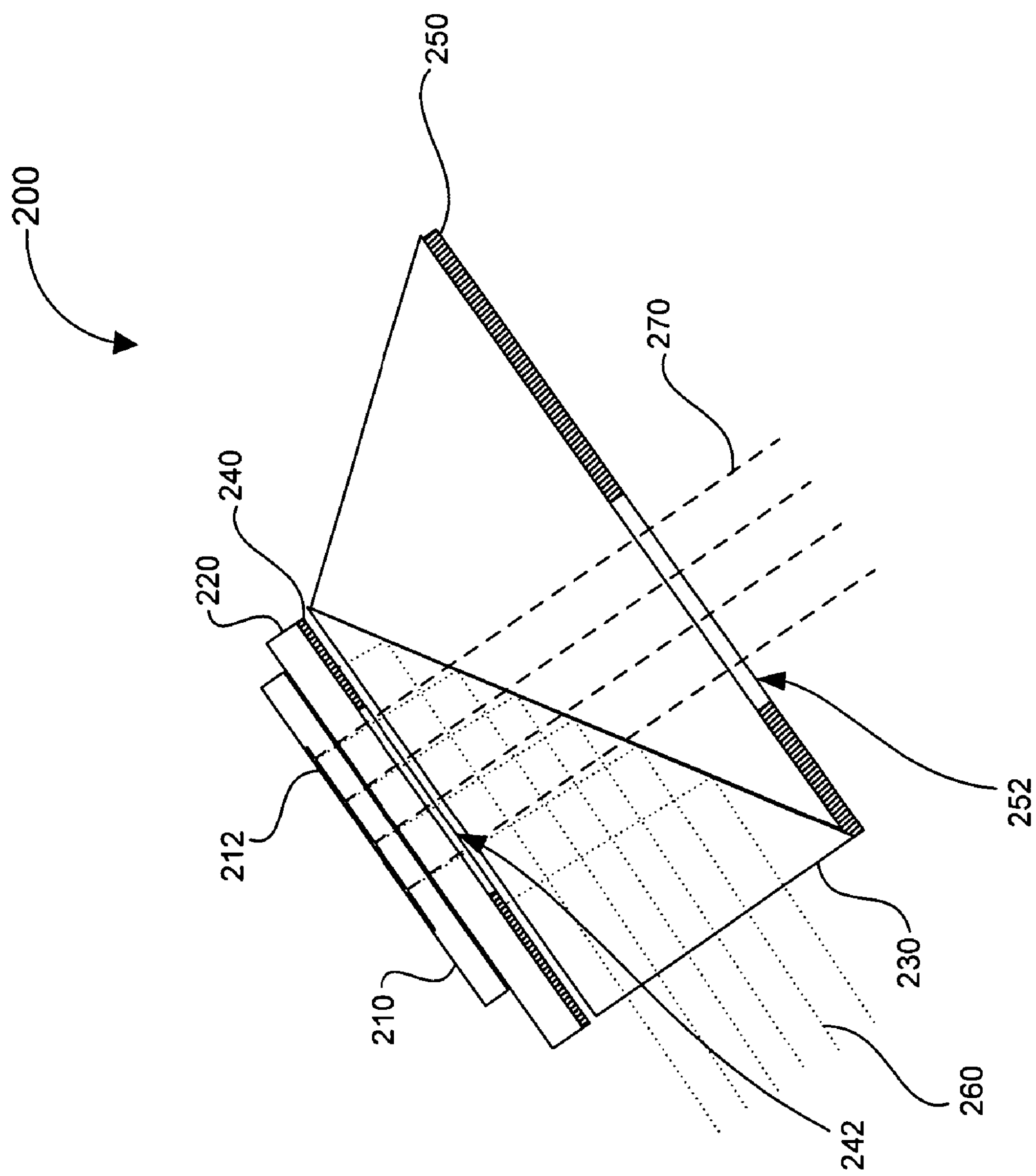
FIG. 4 illustrates an embodiment of a DMD system for digital projectors with external aperturing.

Referring to FIG. 4, a DMD system for use in digital projectors, for example, is illustrated. The illustrated embodiment shows a system 200 including a DMD 210, a DMD cover plate 220 and a TIR prism arrangement 230. The DMD cover plate 220 and the TIR prism 330 are preferably made of glass.

FIG. 4 also illustrates the light paths for incoming light 260 (dotted lines) and outgoing light 270 (dashed lines). Incoming light 260 is directed by the TIR prism arrangement 230 toward the DMD 210, where it strikes an active area 212. In one embodiment, the incoming light 260 is produced by a tightly controlled illumination system adapted to produce a crisp and uniform illumination across the DMD active area 212. In a particular embodiment, the incoming light 260 is dimensioned to substantially conform to the dimensions of the active area. In this regard, the overfill of the incoming light beyond the active area is less than twenty percent in a particular embodiment. Of course, the amount of overfill should be reduced as much as practically possible. A telecentric illumination is provided to produce a uniform illumination across the DMD active area 212 with minimal overfill. Telecentricity limits the angular variation of the rays falling at the DMD active area 212 to approximately twice the numerical aperture of the DMD. Accordingly, in one embodiment, the numerical aperture of the DMD is approximately 12 degrees, and the difference between the maximum and minimum angle of rays falling on the DMD active area between 24 and 26 degrees. The incoming light 260 is reflected by the active area 212, and the outgoing light 270 is directed through the TIR prism arrangement 230 to be guided through, for example, lenses to be projected onto a screen. Although the embodiment illustrated in FIG. 4 includes a device with telecentric architecture, other embodiments are contemplated within the scope of the invention. For example, an embodiment may include a device without the TIR prism. In such a device, a lens and folding mirror may be used to process the illumination.

Figure 5:
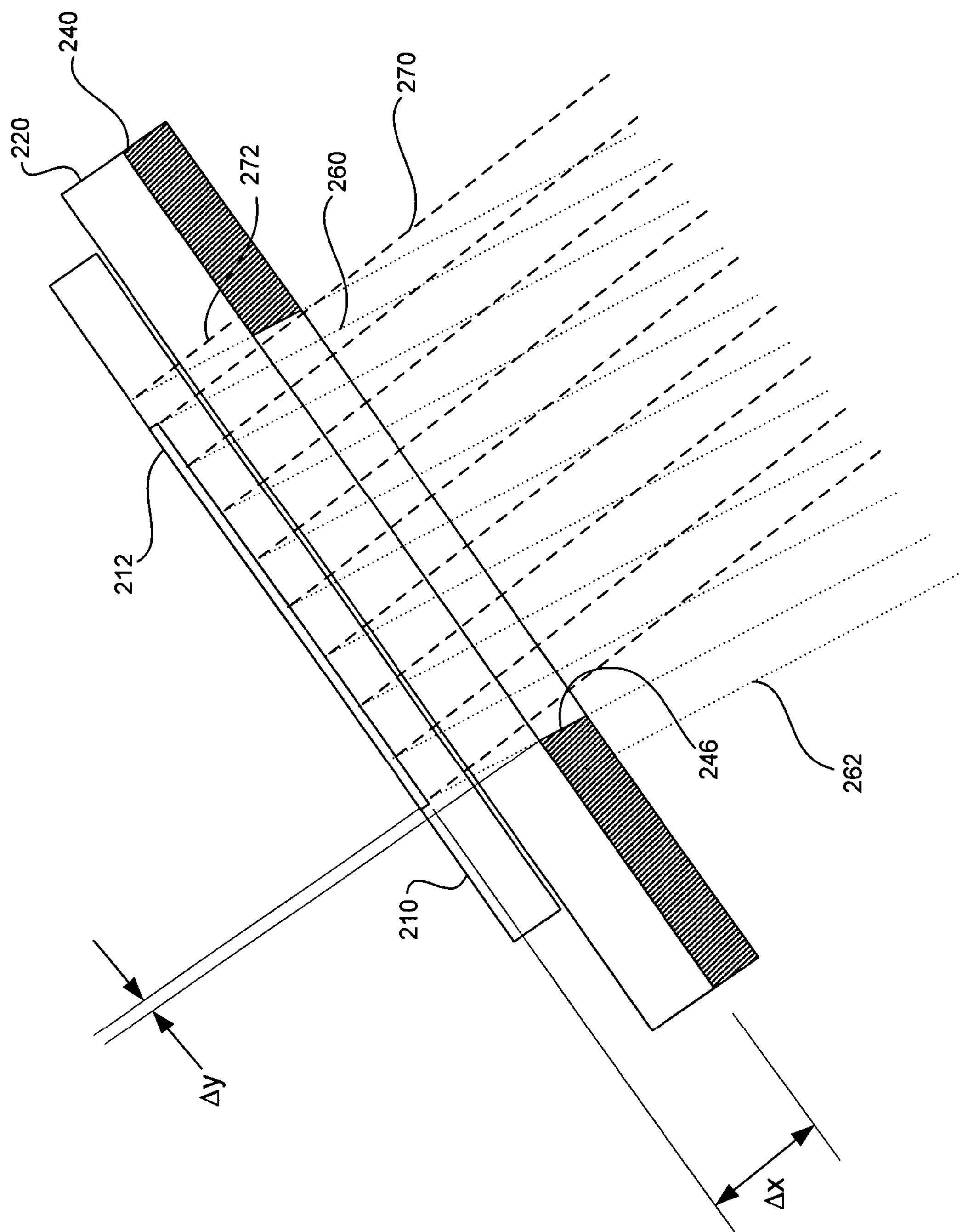
FIG. 5 illustrates the positioning of the external aperture in greater detail.

As noted above, the overfill and the limited non-reflective perimeter of the DMD may result in adverse effects on the contrast of the image generated. In order to reduce these adverse effects the system 200 includes a light-blocking layer 240 having an aperture 242 formed therein. The aperture 242 also improves the uniformity of the light along the edges of the image or active area. The light-blocking layer 240 is positioned on or near the surface of the DMD cover plate 220 and can be placed, formed or otherwise positioned after assembly of the DMD 210 and the cover plate 220. Typically, when received from a manufacturer, the DMD cover plate 220 is already affixed to the DMD 210. Thus, as illustrated in FIG. 5, the light-blocking layer 240 is offset (Δx) from the plane of the active area 212 by at least the thickness of the cover plate 220.

The light-blocking layer 240 may be formed in a number of manners. In one embodiment, the light-blocking layer 240 may be a non-reflective plate that is mechanically positioned near the cover plate 220. The non-reflective aspect of the light-blocking layer 240 can be achieved in a variety of manners, including using a matted black paint. Generally, the surfaces of the light-blocking layer 240 should be as black as possible. A strong anti-reflection coating may be provided on metal to achieve the desired result. In other embodiments, the desired results may be achieved by providing light-absorbing paint or a rough surface with a flat black paint. In still other embodiments, an etching process may be used to form a microstructure that is smaller than the shortest wavelength of the incoming light.

In a particular embodiment, the light-blocking layer 240 is formed by depositing a black mask onto the DMD cover plate 220. The mask may be formed with a combination of dielectric and metal thin films. The edges of the mask should be apodized by creating a microstructure that does not scatter light falling on edges of the mask, as described in greater detail below with reference to FIG. 5. The thickness of the mask should be sufficient to block the light. In a particular embodiment, the mask is formed by dielectric and metal thin films measuring 100 nanometers in thickness.

In other embodiments, the light-blocking layer 240 is affixed to the DMD cover plate 220 by an adhesive. In one such embodiment, the light-blocking layer is also affixed to another optical component, such as the TIR prism arrangement, using an adhesive. In this regard, degradation of contrast due to accumulation of dust or dirt along the light path is reduced by eliminating a gap between the DMD cover plate 220 and the optical component (e.g., the TIR prism arrangement).

The shape and dimensions of the aperture 242 may be adapted for the particular requirements of the device incorporating the DMD, such as a digital projector. In a particular embodiment, the aperture 242 is shaped and dimensioned substantially according to the shape and dimensions of the active area 212 of the DMD 210. For use in most projectors, the aperture 242 is a rectangular opening through the light-blocking layer 240. In one particular embodiment, the active area 212 of the DMD 210 is dimensioned at 18.7 mm×10.5 mm, and the aperture 242 is dimensioned at 20.0 mm×11.3 mm. Note that the size of the aperture 242 is larger than the size of the active area 212 of the DMD 210 since light at the active area plane is the image plane of the illumination and the projection and, therefore, has the smallest size.

In certain embodiments, the adverse effects of overfill may be further reduced by providing a sympathetic aperture 252 along the light path of the outgoing light 270. The sympathetic aperture 252 is formed as a passage through a second light-blocking layer 250. The second light-blocking layer 250 facilitates blocking of any light that may escape the first light-blocking layer 240 by, for example reflecting and passing through the external aperture 242 or light that might have scattered off the edges of the external aperture 242. The second light-blocking layer 250 may be formed of and in a way similar to those described above with reference to the first light-blocking layer 240. For example, the second light-blocking layer may be formed by depositing dielectric and metal thin films onto a surface of the TIR prism arrangement 230. Although the illustrated embodiment shows only a single sympathetic aperture 252, in other embodiments, depending on the particular architecture, multiple sympathetic apertures may be positioned at different planes along the light path through the projection portion. Each such sympathetic aperture blocks undesired light that may have escaped all previous apertures or may have been scattered by the edges of previous apertures.

FIG. 5 illustrates the DMD system with external aperturing of FIG. 4 in greater detail. In particular, FIG. 5 illustrates certain characteristics relating to the light-blocking layer 240. As noted above, the light-blocking layer 240 is positioned such that it is offset from the plane of the active area 212 along the light path. The amount of offset (Δx) is at least the thickness of the DMD cover plate 220. In order to reduce reflections and scattering of incoming light 260 into the projection path, the light-blocking layer 240 is formed such that the inner edges 246 forming the aperture 242 are angled so as to be substantially aligned with the rays of light at the edges. In one example, the incoming light 260 is a beam having a 26-degree angle to the perpendicular to the plane of the light-blocking layer 240 and has a numerical aperture of 12 degrees. In this example, the side edge closest to the light source is angled by 38 degrees (26 degrees plus 12 degrees), while the edge furthest from the light source is angled by 14 degrees (26 degrees minus 12 degrees).

In certain embodiments, the inner edges 246 of the aperture 242 are apodized. In this regard, the transmission characteristics of the light-blocking layer are gently transitioned, rather than an abrupt transition from full transmission (through the aperture) to no transmission (light blocking layer). Such apodization can facilitate a reduction in the diffraction and scattering of the light into the light path.

The difference in the paths of the incoming light 260 and the outgoing light 270 may also dictate the positioning of the aperture 242. For example, as illustrated in FIG. 5, it may be desirable to allow only incoming light 260 reflected from the active area 212 to be passed through the aperture 242. In this regard, the aperture 242 may be positioned to block all incoming light 260 that would otherwise strike the DMD 210 outside the active area 212, as indicated by the blocking of the dotted line 262. However, on the opposite edge, this strategy may result in undesired blocking of reflected, outgoing light 270. Thus, the opposite edge of the aperture 242 is laterally offset (Δy) to accommodate an angle of incidence of the incoming light 260, allowing a certain amount of incoming light to pass and strike outside the active area. Typically, such regions may be provided with a mirror pond which reflects the light onto the outgoing path. This reflected light is then blocked when it is on the outgoing light path, as indicated by dashed line 272.

In certain embodiments, some rows and columns of mirrors in the active area are permanently turned off. In this regard, the external aperture may be dimensioned such that no light falls outside the active area of the DMD. Turning off of a limited number of mirrors has an insignificant effect on the display in certain situations, such as videos, where the overfill light is significantly larger than the active area of the DMD.

The foregoing description of the preferred embodiments of the invention have been presented for purposes of illustration and description. It is not intended to be exhaustive or to limit the invention to the precise form disclosed, and modifications and variation are possible in light of the above teachings or may be acquired from practice of the invention. The embodiment was chosen and described in order to explain the principles of the invention and its practical application to enable one skilled in the art to utilize the invention in various embodiments and with various modification as are suited to the particular use contemplated. It is intended that the scope of the invention be defined by the claims appended hereto and their equivalents.

What is claimed is:

1. A digital micromirror device arrangement, comprising:

a digital micromirror device (DMD) having an active area, the active area being adapted to receive incoming light and reflecting the incoming light as outgoing light;

a cover plate disposed substantially adjacent to the DMD and having a thickness; and a light-blocking layer having an aperture formed therein, the light-blocking layer being offset from a plane of the active area by at least the thickness of the cover plate and being adapted to block light from passing therethrough, the aperture being dimensioned to produce a beam of outgoing light having desired dimensions and wherein the aperture is laterally offset to accommodate an angle of incidence of the incoming light.

2. The arrangement of claim 1, wherein the light-blocking layer is positioned on the cover plate.

3. The arrangement of claim 2, wherein the light-blocking layer is formed by depositing a mask onto the cover plate.

4. The arrangement of claim 3, wherein the mask includes dielectric and metal thin films.

5. The arrangement of claim 4, wherein the dielectric and metal thin films have a thickness of approximately 100 nanometers.

6. The arrangement of claim 2, wherein the light-blocking layer is affixed to the cover plate with an adhesive.

7. The arrangement of claim 6, wherein the light-blocking layer is further affixed to an optical component, thereby eliminating a gap between the cover plate and the optical component.

8. The arrangement of claim 1, wherein the light-blocking layer is a non-reflective plate.

9. The arrangement of claim 8, wherein the non-reflective plate has surfaces with a matted black paint.

10. The arrangement of claim 1, wherein the light-blocking layer includes a microstructure surface.

11. The arrangement of claim 10, wherein the microstructure surface is formed through an etching process.

12. The arrangement of claim 10, wherein the microstructure surface includes microstructure smaller than a shortest wavelength of the incoming light.

13. The arrangement of claim 1, wherein the aperture has a rectangular configuration.

14. The arrangement of claim 1, wherein edges of the aperture are angled to conform to be aligned with rays of the incoming light at the edges.

15. The arrangement of claim 1, wherein edges of the aperture are apodized.

16. The arrangement of claim 1, wherein the incoming light is telecentric.

17. The arrangement of claim 1, further comprising:

a second light-blocking layer having a second aperture formed therein, the second light-blocking layer being positioned along a path of the outgoing light, the second aperture being dimensioned to produce a beam of outgoing light having desired dimensions.

18. The arrangement of claim 1, further comprising:

one or more sympathetic light-blocking layers, each sympathetic light-blocking layer having a sympathetic aperture formed therein, each sympathetic light-blocking layer being positioned along a path of the outgoing light and being adapted to block undesired light having at least one of escaped through and scattered by the aperture of the light-blocking layer or an aperture of another sympathetic light-blocking layer.

19. A digital micromirror device arrangement, comprising:

a digital micromirror device (DMD) having an active area, the active area being adapted to receive incoming light and reflecting the incoming light as outgoing light;

means for covering the DMD disposed substantially adjacent to the DMD and having a thickness; and means for blocking light having an aperture formed therein, the means for blocking light being offset from a plane of the active area by at least the thickness of the means for covering, the aperture being dimensioned to produce a beam of outgoing light having desired dimensions and wherein the aperture is laterally offset to accommodate an angle of incidence of the incoming light.

20. The arrangement of claim 19, wherein the means for blocking light is positioned on the means for covering.

21. The arrangement of claim 20, wherein the means for blocking light is formed by depositing a mask onto the means for covering.

22. The arrangement of claim 21, wherein the mask includes a dielectric and metal thin films.

23. The arrangement of claim 22, wherein the dielectric and a metal thin films have a thickness of approximately 100 nanometers.

24. The arrangement of claim 20, wherein the means for blocking light is affixed to the means for covering with an adhesive.

25. The arrangement of claim 24, wherein the means for blocking light is further affixed to an optical means, thereby eliminating a gap between the means for covering and the optical means.

26. The arrangement of claim 19, wherein the means for blocking light includes a microstructure surface.

27. The arrangement of claim 19, wherein the aperture has a rectangular configuration.

28. The arrangement of claim 19, wherein the aperture includes apodized edges.

29. The arrangement of claim 19, wherein the incoming light is telecentric.

30. A digital projector, comprising:

a digital micromirror device arrangement comprising:

a digital micromirror device (DMD) having an active area, the active area being adapted to receive incoming light and reflecting the incoming light as outgoing light;

a cover plate disposed substantially adjacent to the DMD and having a thickness; and a light-blocking layer having an aperture formed therein, the light-blocking layer being offset from a plane of the active area by at least the thickness of the cover plate and being adapted to block light from passing therethrough, the aperture being dimensioned to produce a beam of outgoing light having desired dimensions and wherein the aperture is laterally offset to accommodate an angle of incidence of the incoming light.

31. The digital projector of claim 30, wherein the light-blocking layer is positioned on the cover plate.

32. The digital projector of claim 31, wherein the light-blocking layer is formed by depositing a mask onto the cover plate.

33. The digital projector of claim 32, wherein the mask includes dielectric and metal thin films.

34. The digital projector of claim 30, wherein the aperture has a rectangular configuration.

35. The digital projector of claim 30, wherein the aperture includes apodized edges.

36. The digital projector of claim 30, wherein the incoming light is telecentric.

37. The digital projector of claim 30, further comprising:

a second light-blocking layer having a second aperture formed therein, the second light-blocking layer being positioned along a path of the outgoing light, the second aperture being dimensioned to produce a beam of outgoing light having desired dimensions.

38. A method of forming a digital micromirror device arrangement, comprising:

disposing a light-blocking layer along a light path for a digital micromirror device (DMD) having an active area, the active area being adapted to receive incoming light and reflecting the incoming light as outgoing light, the light path corresponding to at least one of the incoming light and the outgoing light, a cover plate being disposed substantially adjacent to the DMD; and offsetting the light-blocking layer from a plane of the active area by at least a thickness of the cover plate;

wherein the light-blocking layer includes an aperture formed therein, the light-blocking layer being adapted to block light from passing therethrough, and the aperture being dimensioned to produce a beam of outgoing light having desired dimensions and wherein the aperture is laterally offset to accommodate an angle of incidence of the incoming light.

39. The method of claim 38, wherein the step of disposing a light-blocking layer includes disposing the light-blocking layer on the cover plate.

40. The method of claim 39, wherein the step of disposing the light-blocking layer includes depositing a mask onto the cover plate.

41. The method of claim 38, further comprising:

disposing a second light-blocking layer having a second aperture formed therein along a path of the outgoing light, the second aperture being dimensioned to produce a beam of outgoing light having desired dimensions.

42. A method of using a digital micromirror device arrangement, comprising:

directing incoming light into a digital micromirror device (DMD) having an active area, the active area being adapted to receive the incoming light and reflecting the incoming light as outgoing light, a cover plate being disposed substantially adjacent to the DMD and having a thickness; and passing at least one of the incoming light and the outgoing light through an aperture of a light-blocking layer disposed along a light path of at least one of the incoming light and the outgoing light, the light-blocking layer being offset from a plane of the active area by at least the thickness of the cover plate wherein the aperture is laterally offset to accommodate an angle of incidence of the incoming light.

* * * * *